(12) United States Patent
Aqrawi et al.

(10) Patent No.: US 9,341,729 B2
(45) Date of Patent: May 17, 2016

(54) AMPLITUDE CONTRAST SEISMIC ATTRIBUTE

(75) Inventors: Ahmed Adnan Aqrawi, Stavanger (NO); Trond Hellem Bø, Randaberg (NO)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 908 days.

(21) Appl. No.: 13/438,649

(22) Filed: Apr. 3, 2012

(65) Prior Publication Data
US 2012/0257477 A1    Oct. 11, 2012

Related U.S. Application Data

(60) Provisional application No. 61/472,230, filed on Apr. 6, 2011.

(51) Int. Cl.
| G01V 1/28 | (2006.01) |
|---|---|
| G01V 1/32 | (2006.01) |
| G01V 1/30 | (2006.01) |

(52) U.S. Cl.
CPC ............ *G01V 1/325* (2013.01); *G01V 1/307* (2013.01); *G01V 2210/74* (2013.01)

(58) Field of Classification Search
CPC .... G01V 1/325; G01V 1/307; G01V 2210/74
USPC ................................................ 367/53, 37, 38
See application file for complete search history.

(56) References Cited

U.S. PATENT DOCUMENTS

| 6,092,025 | A  | * | 7/2000  | Neff ................................. 702/10 |
| 6,151,555 | A  |   | 11/2000 | Van Bemmel et al. |
| 8,150,151 | B2 | * | 4/2012  | Gori et al. ..................... 382/166 |
| 2008/0212887 | A1 |   | 9/2008 | Gori et al. |
| 2012/0253681 | A1 | * | 10/2012 | Romero et al. ................. 702/14 |

OTHER PUBLICATIONS

"Sobel operator," Mar. 24, 2010, Wikipedia, downloaded Feb. 25, 2015 from http://en.wikipedia.org/w/index.php?title=Sobel_operator&oldid=351797455, 5 pages.*
Randen, T. et al., "Three Dimensional Texture Attributes for Seismic Data Analysis," SEG Expanded Abstracts, Aug. 2000, 4 pages.
Bahorich, M. and S. Farmer, "3-D Seismic Discontinuity for Faults and Stratigraphic Features: The Coherence Cube," The Leading Edge, vol. 14, Oct. 1995, 4 pages.
(Continued)

*Primary Examiner* — Daniel L Murphy
(74) *Attorney, Agent, or Firm* — Colin L. Wier; Rodney Warfford; Alec McGinn

(57) ABSTRACT

A method for visualizing seismic data of a subterranean formation, including obtaining an estimated dip field of the subterranean formation, wherein the estimated dip field represents a measure of deviation of a stratigraphic layer from flat, extracting a matrix data item surrounding a voxel of the seismic data, wherein the matrix data item is extracted from the seismic data based on a value of the estimated dip field surrounding the voxel, generating modified seismic data by at least applying a matrix operator to the seismic data, wherein the matrix operator calculates a partial derivative of the seismic data using the matrix data item, and displaying the modified seismic data.

18 Claims, 9 Drawing Sheets

(56) References Cited

OTHER PUBLICATIONS

Roberts, A., "Curvature Attributes and their Application to 3D Interpreted Horizons," First Break, vol. 19.2, Feb. 2001, 16 pages.

Boe, T. and R. Daber, "Seismic Features and the Human Eye: RGB Blending of Azimuthal Curvatures for Enhancement of Fault and Fracture Interpretation," SEG Denver 2010 Annual Meeting, Oct. 2010, 5 pages.

Aqrawi, A. and T. Boe, "Imaging Structural Geology with Dip and Directional Dip," Abstract for Search and Discovery Article #90141, 10th Middle Eastern Geosciences Conference and Exhibition, Mar. 2012, 1 page.

Office Action issued in related MX application MX/a/2012/004165 on May 7, 2015, 8 pages.

* cited by examiner

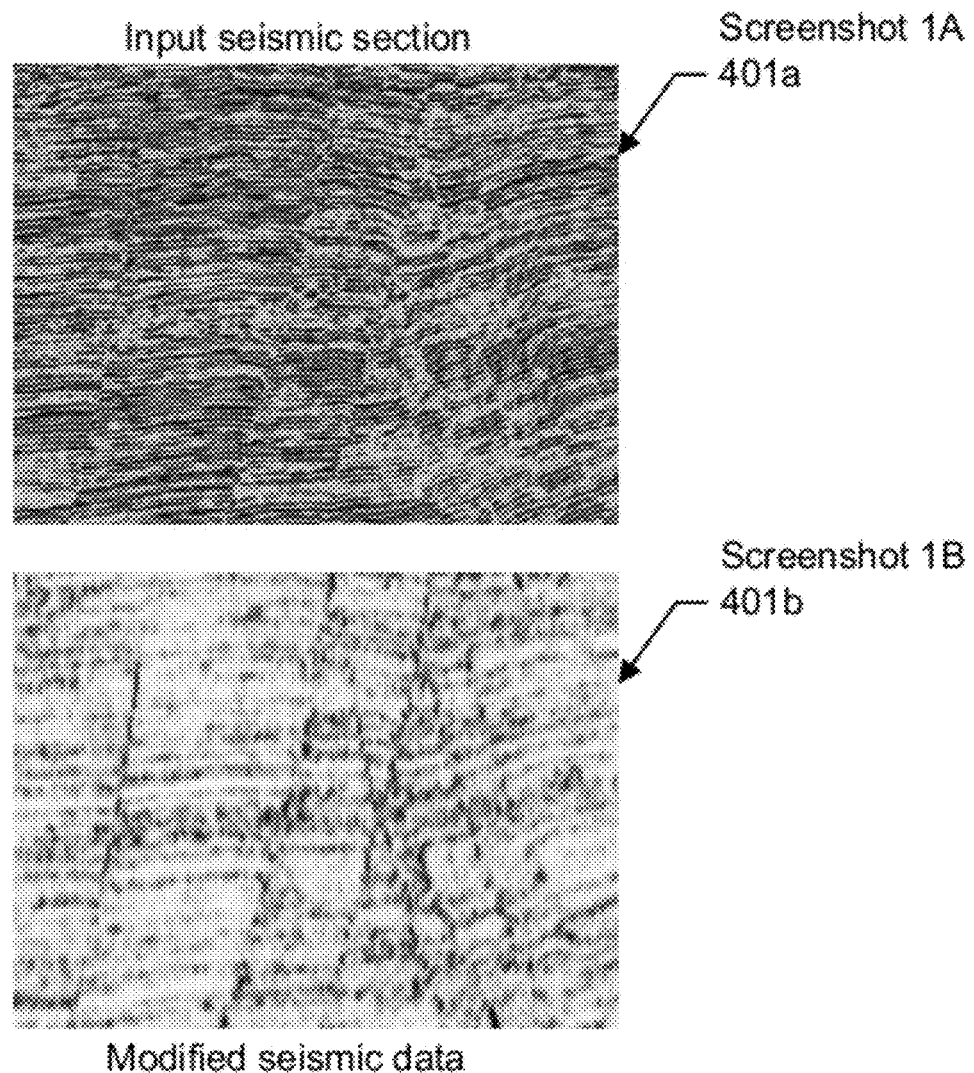
FIG. 4.1

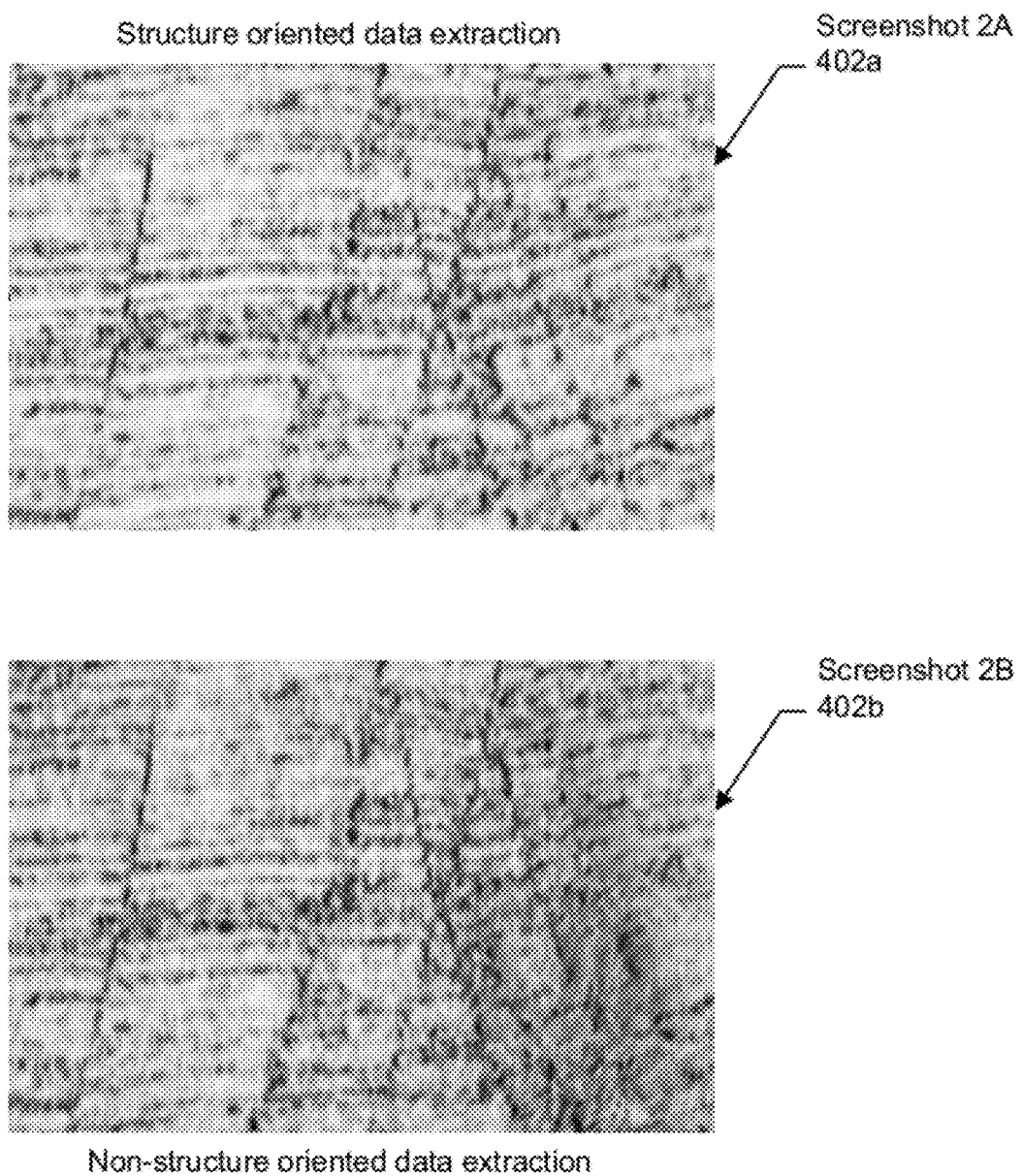
FIG. 4.2

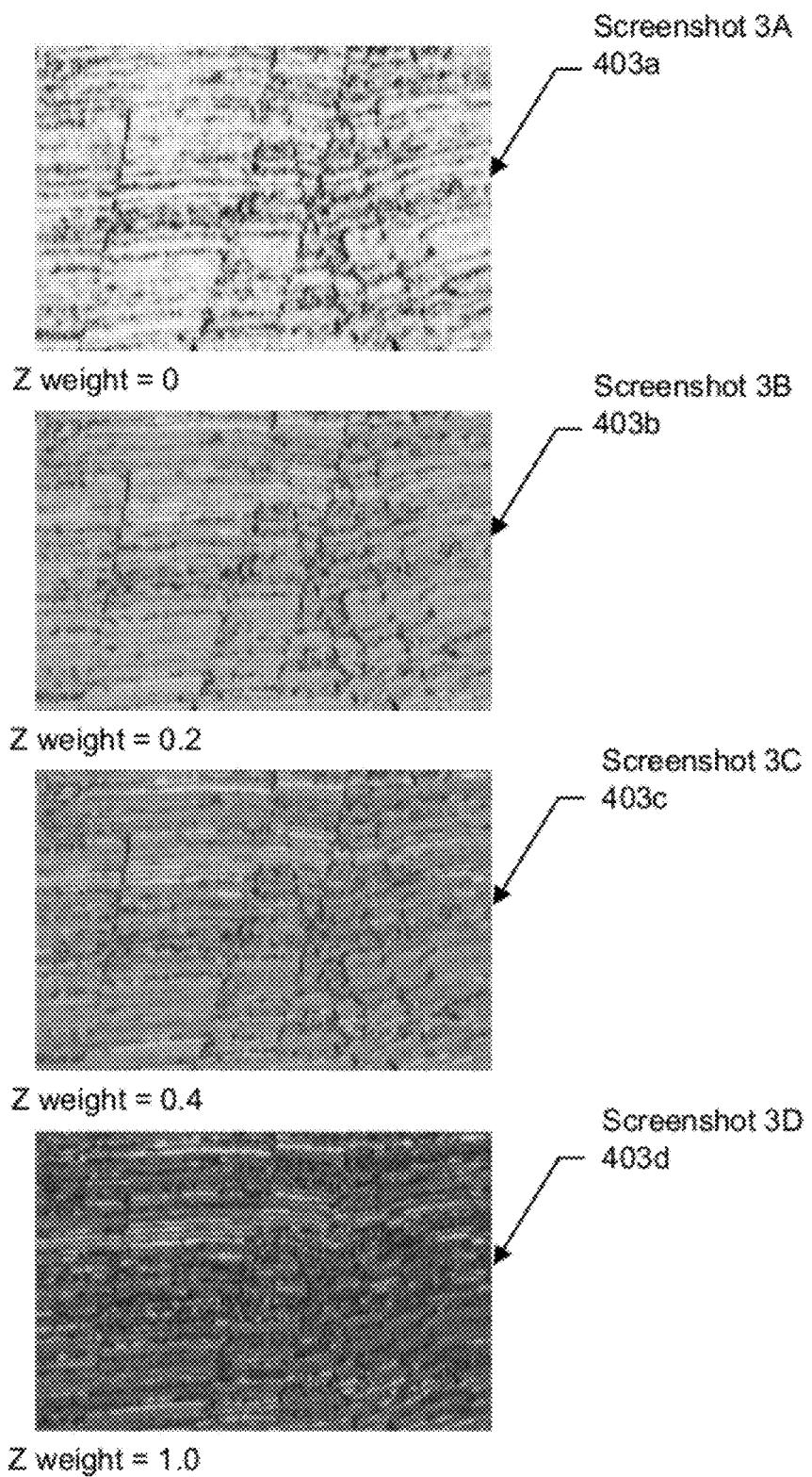
FIG. 4.3

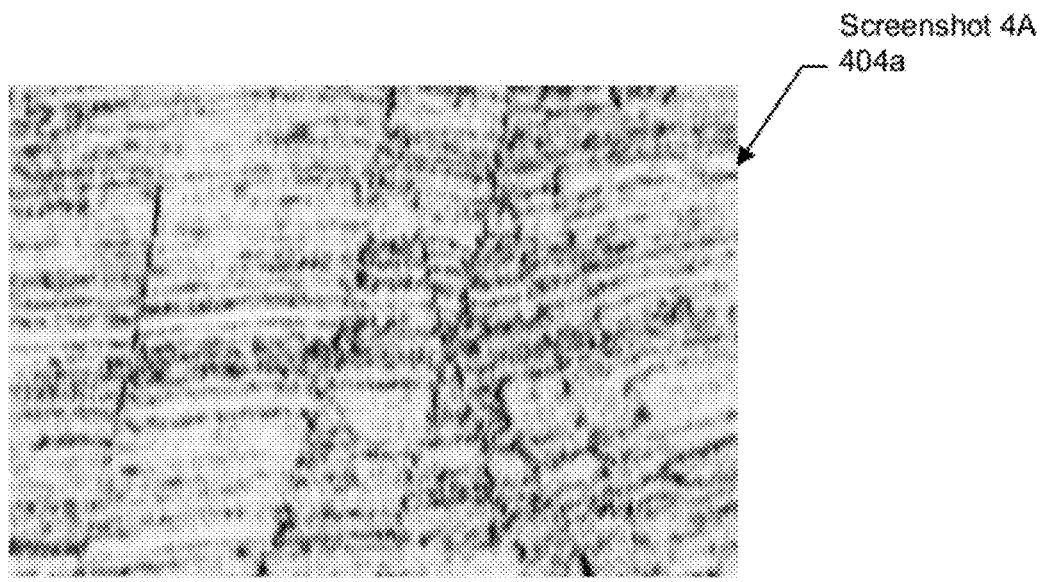
Amplitude contrast with normalization
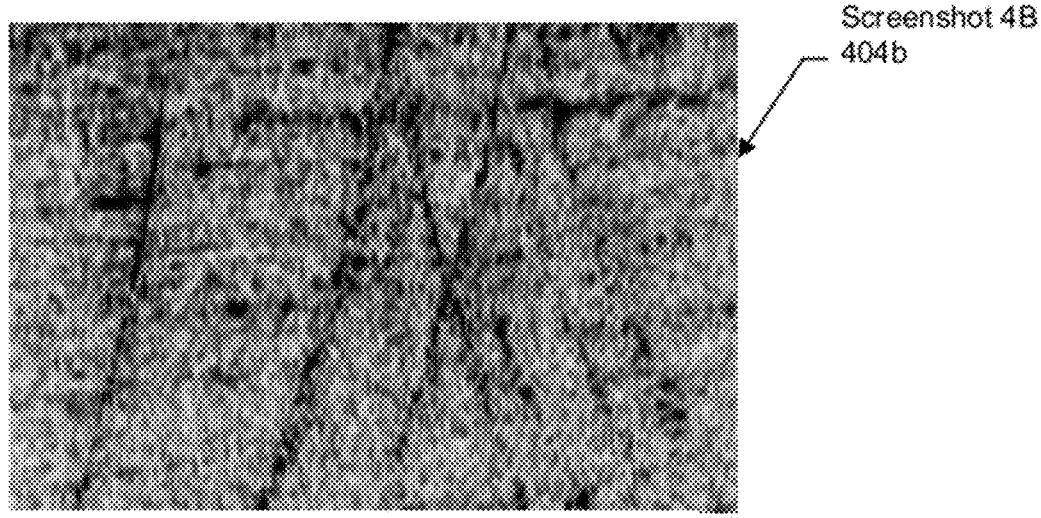
Amplitude contrast without normalization
FIG. 4.4

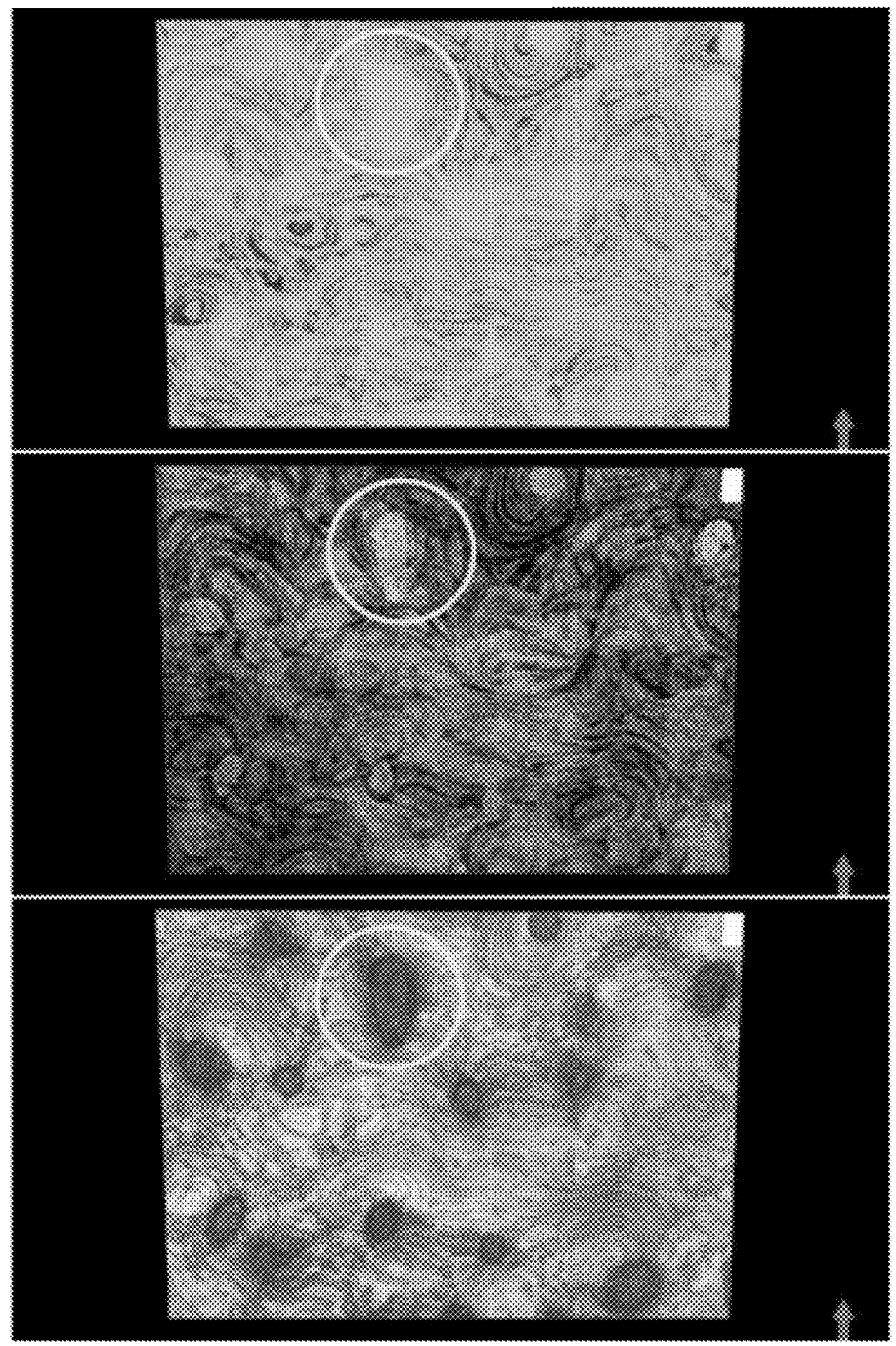
Top: Input seismic. Middle: Amplitude contrast without normalization. Bottom: Amplitude contrast with normalization. Circled areas: Low amplitude salt area.
FIG. 4.5

AMPLITUDE CONTRAST SEISMIC ATTRIBUTE

CROSS REFERENCE TO RELATED APPLICATIONS

This application claims priority under 35 U.S.C. §119 from Provisional Patent Application No. 61/472,230 filed Apr. 6, 2011, with common inventors.

BACKGROUND

Approaches exist in the industry for fault and salt body detection based on the premise that seismic faulting and salt introduce discontinuities in the seismic horizons. Several seismic attributes (e.g., chaos, coherence, variance, curvature, and Sobel filter attributes, etc.) have been used to enhance this discontinuity. Subsequent to the enhancement, the structures are extracted and compared to the original seismic data for quality control.

The Sobel operator is used in image processing, particularly within edge detection algorithms. Technically, it is a discrete differentiation operator, computing an approximation of the opposite of the gradient of the image intensity function. At each point in the image, the result of the Sobel operator is either the corresponding opposite of the gradient vector or the norm of this vector. The Sobel operator is based on convolving the image with a small, separable, and integer valued filter in horizontal and vertical directions and is therefore relatively inexpensive in terms of computations. On the other hand, the opposite of the gradient approximation that it produces is relatively crude, in particular for high frequency variations in the image. Mathematically, the Sobel operator uses two 3×3 kernels which are convolved with the original image to calculate approximations of the derivatives—one for horizontal changes, and one for vertical. If A represents the source image, and $G_x$ and $G_y$ represent two images which at each point contain the horizontal and vertical derivative approximations, the two dimensional Sobel operators are shown in a 3 by 3 matrix form as follows:

$$G_s = \begin{bmatrix} -1 & 0 & +1 \\ -2 & 0 & +2 \\ -1 & 0 & +1 \end{bmatrix} * A \text{ and } G_y = \begin{bmatrix} -1 & -2 & -1 \\ 0 & 0 & 0 \\ +1 & +2 & +1 \end{bmatrix} * A$$

where * denotes the 2-dimensional convolution operation.

SUMMARY

In general, in one aspect, the invention relates to a method for visualizing seismic data of a subterranean formation. The method may include obtaining an estimated dip field of the subterranean formation, wherein the estimated dip field represents a measure of deviation of a stratigraphic layer from flat, extracting, by a computer processor, a matrix data item surrounding a voxel of the seismic data, wherein the matrix data item is extracted from the seismic data based on a value of the estimated dip field surrounding the voxel, generating, by the computer processor, modified seismic data. The generating may include applying a matrix operator to the seismic data, wherein the matrix operator may calculate a partial derivative of the seismic data using the matrix data item, and displaying the modified seismic data.

Other aspects of the invention will be apparent from the following detailed description and the appended claims.

BRIEF DESCRIPTION OF DRAWINGS

The appended drawings illustrate several embodiments of amplitude contrast seismic attribute and are not to be considered limiting of its scope, for amplitude contrast seismic attribute may admit to other equally effective embodiments.

FIGS. 4.1-4.5 depict an example of processing seismic data based on amplitude contrast seismic attribute in accordance with one or more embodiments.

DETAILED DESCRIPTION

Figure 1:
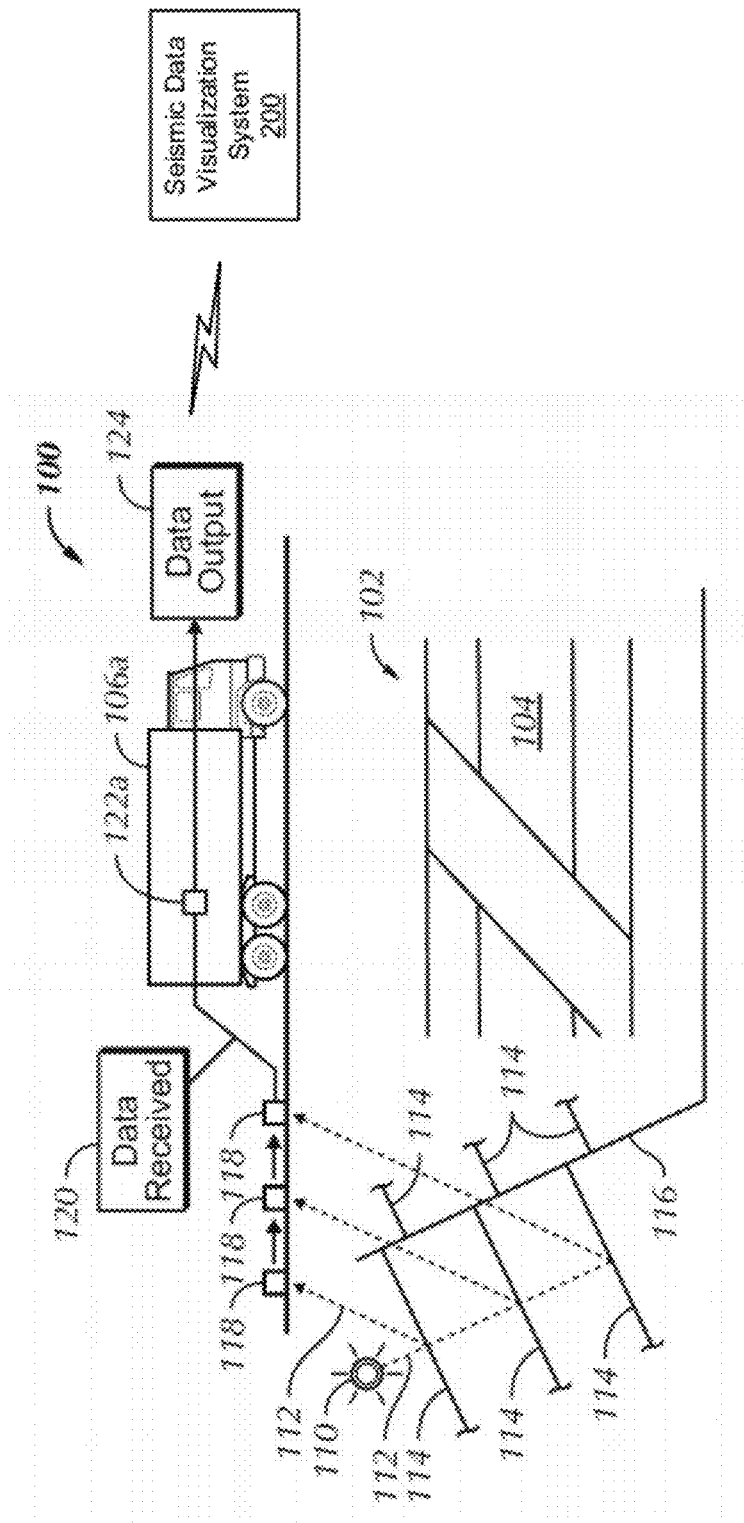
FIG. 1 depicts a survey operation to measure properties of the subterranean formation in which one or more embodiments of amplitude contrast seismic attribute may be implemented.

Aspects of the present disclosure are shown in the above-identified drawings and described below. In the description, like or identical reference numerals are used to identify common or similar elements. The drawings are not necessarily to scale and certain features may be shown exaggerated in scale or in schematic in the interest of clarity and conciseness.

Aspects of the present disclosure include a method, system, and computer readable medium of processing and visualizing seismic data using amplitude contrast. Amplitude contrast is a Sobel based attribute that has been used in detecting structural geology. Similar to the Sobel filter, amplitude contrast is a computation of the amplitude derivatives between neighboring traces where the non-diagonal neighbors are weighted twice as much. The calculated differences are then normalized and the final value is calculated using Equations (1), (2), (3) and (4) (below), where Sx, Sy and Sz are the weighting operators in the corresponding dimensions. Here the values are squared to avoid negative differences, and finally the square root of the sum of the squared values is calculated as the result.

$$Gradient_x = S_x * Input \qquad (1)$$

$$Gradient_y = S_y * Input \qquad (2)$$

$$Gradient_z = S_z * Input \qquad (3)$$

$$Result = \sqrt{Gradient_x^2 + Gradient_y^2 + Gradient_z^2} \qquad (4)$$

FIG. 1 depicts a survey operation being performed by a seismic recording truck (106a) to measure properties of the subterranean formation. The survey operation is a seismic survey operation for producing sound vibrations. In FIG. 1, an acoustic source (110) produces sound vibrations (112) that reflect off a number of horizons (114) and other structures such as a fault (116) in an earth formation. The sound vibration(s) (112) is (are) received by sensors, such as geophonereceivers (118), situated on the earth's surface, and the geophones (118) produce electrical output signals, referred to as data received (120) in FIG. 1.

The received sound vibration(s) (112) are representative of different parameters, such as amplitude and/or frequency. The data received (120) is provided as input data to a computer (122a) of the seismic recording truck (106a), and responsive to the input data, the recording truck computer (122a) generates a seismic data output record (124). The seismic data output record (124) may be further processed and presented, by the seismic data visualization system (200), to a user (e.g., a geologist, an oilfield engineer, etc.) for performing field operations, such as extracting subterranean assets, etc. For example, the seismic data visualization system (200) may be located in a surface unit of the field for extracting the subterranean assets, or located in a remote computing facility away from the field. The subterranean assets include but are not limited to hydrocarbons such as oil. Throughout this document, the terms "oilfield" and "oilfield operation" may be used interchangeably with the terms "field" and "field operation" to refer to a site where any types of valuable fluids can be found and the activities required for extracting them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion, and/or production using the wellbore.

In one or more embodiments of the invention, seismic data output record (124) is processed by the seismic data visualization system (200). Throughout this document, the seismic data output record (124) is generally referred to as seismic, seismic data, seismic cube, or seismic volume. Generally, the seismic volume consists of a large number of basic seismic data elements referred to as voxels and is also referred to as a voxel space. The 3D edge detection operator is applied at every voxel in the seismic cube. Edges in seismic can be seen as changes in seismic amplitude caused by discontinuities such as faults and fractures. Since seismic layers also are seen as changes in amplitudes, a direct 3D Sobel operator will highlight both stratigraphic layers and discontinuities in the seismic data. These highlighted stratigraphic layers obscure the visualization of the discontinuities, such as fault or salt body. In one or more embodiments, three modifications are applied that are different from a basic 3D Sobel operator in order to focus on the edges in the seismic data representing discontinuities. The three modifications are structure oriented data extraction, introducing axis weights, and amplitude normalization. The first two modifications cause the filter to focus edge detection on discontinuities and chaotic seismic, e.g. the lack of well defined stratigraphic structure. The third modification, the normalization, causes the amplitude changes to be measured relative to the input amplitude, e.g. it causes chaotic low amplitude regions also to be highlighted.

Figure 2:
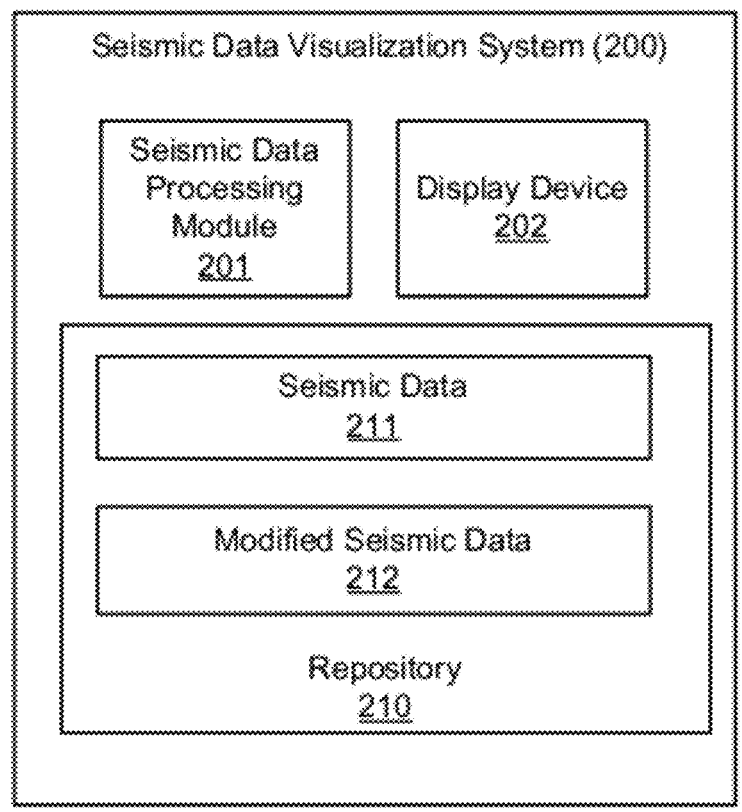
FIG. 2 shows a system for processing seismic data based on amplitude contrast seismic attribute in accordance with one or more embodiments.

FIG. 2 shows details of the seismic data visualization system (200) in which one or more embodiments of amplitude contrast seismic attribute may be implemented. As shown in FIG. 2, the seismic data visualization system (200) includes a seismic data processing module (201), a display device (202), and a repository (210). In one or more embodiments, one or more of the modules and elements shown in FIG. 2 may be omitted, repeated, and/or substituted. Accordingly, embodiments of amplitude contrast seismic attribute should not be considered limited to the specific arrangements of modules shown in FIG. 2.

As noted above, seismic data output record (124) of the subterranean formation is sent and stored in the repository (210) of the seismic data processing module (201) as seismic data (211) for processing. In one or more embodiments, the seismic data processing module (201) may perform the following: (i) obtain an estimated dip field of the subterranean formation, where the estimated dip field represents a measure of deviation of a stratigraphic layer from flat; (ii) extract a matrix data item surrounding a voxel of the seismic data (211), where the matrix data item is extracted from the seismic data (211) based on a value of the estimated dip field surrounding the voxel; and (iii) generate modified seismic data (212) by at least applying a matrix operator to the matrix data item, where the matrix operator calculates a partial derivative of the seismic data (211) using the matrix data item. In one or more embodiments, the modified seismic data (212) is displayed by the display device (202) (e.g., a two-dimensional display, a three-dimensional display, or any suitable computer display device) for visualization by the user. Additional details of generating the modified seismic data (212) from the seismic data (211) are described below.

Examples of non-flat stratigraphic layers are represented in the example seismic section shown in FIG. 4.1, where the deviation from flat varies throughout the subterranean formation. In one or more embodiments, the aforementioned matrix data item is a 3 by 3 by 3 matrix extracted from the seismic data (211) surrounding a voxel of the seismic data (211) and is mathematically represented by Data(x, y, z) for x, y, z in $\{-1, 0, 1\}$, i.e., x, y, or z can be $-1$, 0, or 1 to form the 3 by 3 by 3 matrix. The term voxel refers to an element in the seismic data (211), represented by Input (i, j, k), at position (i, j, k) of the voxel space. Accordingly, the matrix data item is extracted based on Data(x, y, z)=Input(i+x, j+y, k+z+x*dipIL (i, j, k)+y*dipXL (i, j, k)), where dipIL (i, j, k) represents an inline dip of the estimated dip field at the position (i, j, k) of the voxel space, and dipXL (i, j, k) represents a crossline dip of the estimated dip field at the position (i, j, k) of the voxel space.

In one or more embodiments, the modified seismic data is generated by applying first, second, and third matrix operators to the seismic data. In particular, these matrix operators may calculate first, second, and third partial derivatives, respectively, of the seismic data along three orthogonal directions using the matrix data item. For example the first, second, and third matrix operators may be a 3D Sobel operator or a variation thereof. In one or more embodiments, contributions of the first, second, and third partial derivatives to the modified seismic data is adjusted, based on pre-determined weighting factors, along a perpendicular direction of the stratigraphic layer. For example, the modified seismic data may be mathematically represented by $$S=\sqrt{G_X^2+G_Y^2+W_Z^2 G_Z^2},$$

wherein Gx, Gy, and Gz are proportional to the first, second, and third partial derivatives, respectively, and where Wz is a pre-determined fraction. In one or more embodiments, Wz is in the range of approximately [0, 0.4]. In one or more embodiments, contributions of the partial derivatives to the modified seismic data are further normalized based on a magnitude of the seismic data. Additional details of generating the modified seismic data for visualization are described in reference to FIGS. 4.1-4.3 below.

Figure 3:
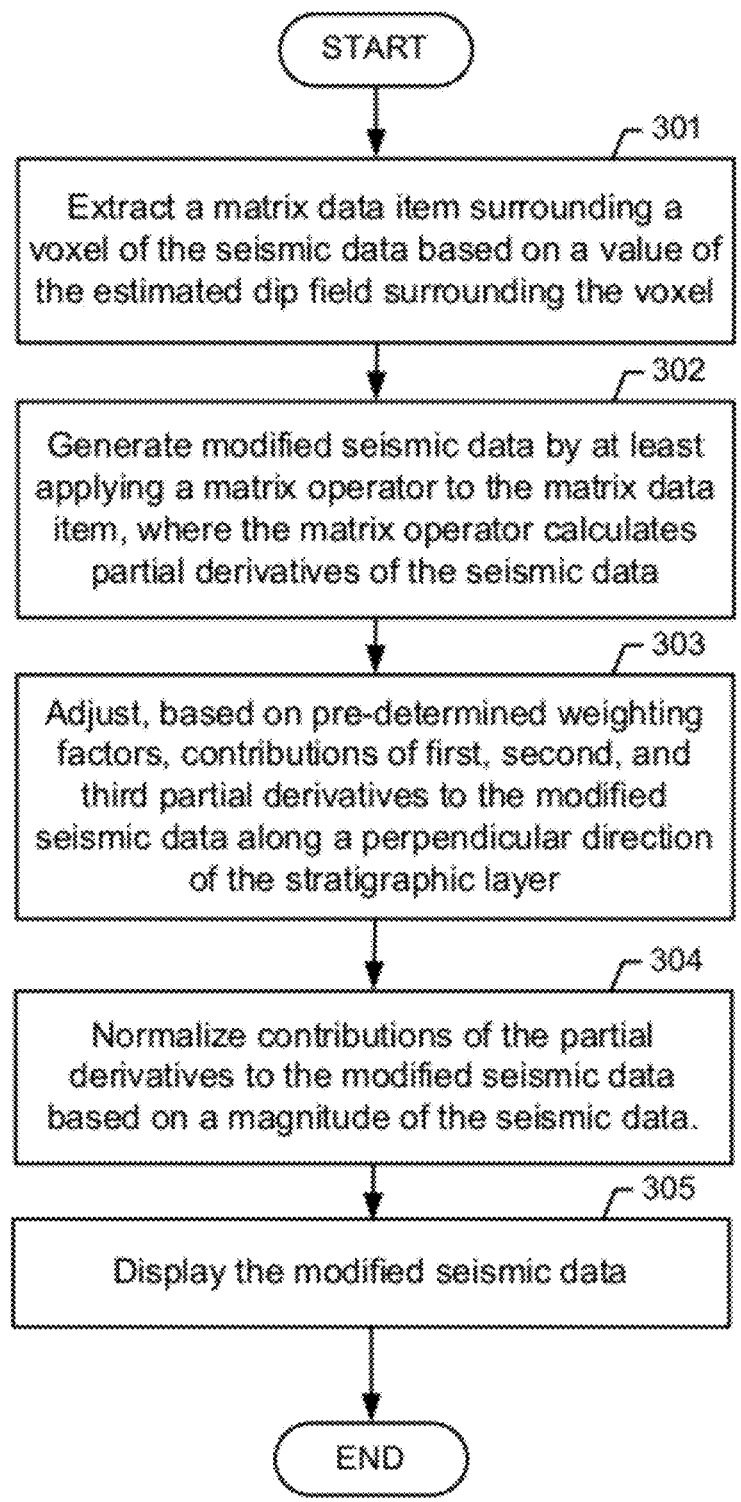
FIG. 3 depicts an example method of processing seismic data based on amplitude contrast seismic attribute in accordance with one or more embodiments.

FIG. 3 depicts a flow chart of an example method for processing seismic data for amplitude contrast seismic attribute in accordance with one or more embodiments. For example, the method depicted in FIG. 3 may be practiced using the seismic data visualization system (200) described in reference to FIGS. 1 and 2 above. In one or more embodiments, one or more of the elements shown in FIG. 3 may be omitted, repeated, and/or performed in a different order.

Generally, the method depicted in FIG. 3 allows a user to view (i.e., visualize) seismic data of a subterranean formation with enhanced clarity. In Block 301, an estimated dip field of the subterranean formation is obtained to represent a measure of deviation of a stratigraphic layer from flat. Further, a matrix data item (e.g., a 3 by 3 by 3 matrix) is extracted from the seismic data surrounding a voxel of the seismic data. In one or more embodiments, the matrix data item is extracted from the seismic data based on a value of the estimated dip field surrounding the voxel. This is referred to as the structure oriented data extraction. Mathematically, the 3 by 3 by 3 matrix of the matrix data item is represented by Data(x, y, z) for x, y, z in $\{-1, 0, 1\}$, i.e., x, y, or z can be $-1$, 0, or 1 to form the 3 by 3 matrix. The voxel of the seismic data is represented by Input (i, j, k), at position (i, j, k) of the voxel space. The matrix data item is extracted based on Data(x, y, z)=Input(i+x, j+y, k+z+x*$dip_{IL}$ (i, j, k)+y*$dip_{XL}$ (i, j, k)), where $dip_{IL}$ (i, j, k) represents an inline dip of the estimated dip field at the position (i, j, k) of the voxel space, and $dip_{XL}$, (i, j, k) represents a crossline dip of the estimated dip field at the position (i, j, k) of the voxel space.

In Block 302, seismic data is modified to generate modified seismic data by at least applying a matrix operator to the seismic data. In particular, the matrix operator calculates one or more partial derivatives of the seismic data using the matrix data item. In one or more embodiments, the matrix operator is a three dimensional (3D) operator, such as a Sobel operator, that generates first, second, and third partial derivatives of the seismic data along a perpendicular direction of the stratigraphic layer using the matrix data item.

In Block 303, contributions of the first, second, and third partial derivatives to the modified seismic data are adjusted, based on pre-determined weighting factors. This is referred to as introducing axis weights into the seismic data. In one or more embodiments, the modified seismic data is mathematically represented by $$S=\sqrt{G_X^2+G_Y^2+W_Z^2 G_Z^2},$$

wherein $G_x$, $G_y$, and $G_z$ are proportional to the first, second, and third partial derivatives, respectively, and where $W_z$ is a pre-determined fraction. In one or more embodiments, $W_z$ is in the range of approximately [0, 0.4].

In Block 304, contributions of the partial derivatives to the modified seismic data are further normalized based on a magnitude of the seismic data. This is referred to as amplitude normalization.

In Block 305, the modified seismic data is displayed to a user. Additional details of generating the modified seismic data for visualization are described in reference to FIGS. 4.1-4.3 below.

FIGS. 4.1-4.5 depict an example of processing seismic data based on the amplitude contrast seismic attribute in accordance with one or more embodiments.

FIG. 4.1 shows a screenshot 1A (401a) of input seismic section (corresponding to seismic data output record (124) of FIG. 1) where stratigraphic layers (corresponding to horizons (114) of FIG. 1) are clearly delineated, and to certain extent obscuring the fault (corresponding to fault (116) of FIG. 1) intersecting the stratigraphic layers. In addition, FIG. 4.1 shows a screenshot 1B (401b) of amplitude contrast output, which is the modified seismic data based on the three aforementioned modifications of Sobel operator, namely: structure oriented data extraction, introducing axis weights, and amplitude normalization. As noted above, the first two modifications cause the filter to focus edge detection on discontinuities and chaotic seismic, and, to certain extent, suppresses the well defined stratigraphic structure to bring out the image of the fault with more clarity. The third modification, the normalization, causes the amplitude changes to be measured relative to the input amplitude, e.g. it causes chaotic low amplitude regions (e.g., a salt body) also to be highlighted.

FIG. 4.2 shows a comparison between a screenshot 2A (402a) of input seismic section processed based on amplitude contrast with structure oriented data extraction and a screenshot 2B (402b) of input seismic section processed based on plain amplitude contrast without dependence on the dip field. Specifically, the input to the edge detection operator used to generate the screenshot 2A (402a) is extracted according to an estimated dip field in the following way. The dip specifies how much the stratigraphic layers in the seismic deviate from flat. If all layers were flat, a horizontal 2D operator would be well suited to detect discontinuities. For each voxel in the seismic cube, the data is extracted according to the mathematical formula described in FIG. 3 that makes the input to the 3D operator seem to come from a seismic cube with only flat layers.

In contrast to the formula Data(x, y, z)=Input(i+x, j+y, k+z+x*$dip_{IL}$ (i, j, k)+y*$dip_{XL}$ (i, j, k)) described in FIG. 3, a plain data extraction would be done using Data(x, y, z)=Input (i+x, j+y, k+z). The effects of using these two different data extraction methods are seen in FIG. 4.2. A grey shade is present in the steepest dipping area when using plain data extraction as shown in the screenshot 2B (402b). This shade is suppressed/eliminated using structure oriented extraction as shown in the screenshot 2A (402a).

In order to extract values that are not exactly at an integer coordinate in the input data, values may be interpolated using a higher order polynomial, such as spline or interpolation function. For the example shown in FIG. 4.2, cubic spline interpolation is used in the Z direction.

FIG. 4.3 shows the effect of the 3D operator with axis weighting. In essence the operator calculates the partial first derivatives in dimensions X, Y, and Z for the 3 by 3 by 3 matrix data item. For example, there are nine first derivative estimates for each principal axis. These nine estimates are weighted so that more central estimates have higher weight than the more distant estimates. As an example, the estimates in the Z direction DZ are weighted and summed in the following manner:

For x and y in $\{-1, 0, 1\}$: $G_Z$=sum $(D_Z(x,y) \times 2^{(1-|x|)} \times 2^{(1-|y|)})$, $G_X$ and $G_Y$ are calculated in the same manner. An un-modified Sobel operation is calculated as:

$$S=\sqrt{G_X^2+G_Y^2+W_Z^2 G_Z^2}$$

However, this operator would detect all the stratigraphic layers in the seismic, as shown in the screenshot 3D (403d), which is not what is of interest here. Therefore, a modified operator is defined where the contribution from GZ is weighted down relative to GX and GY. This weight WZ is in the range of [0, 0.4]. The modified operator then is defined as:

$$S=\sqrt{G_X^2+G_Y^2+W_Z^2 G_Z^2}$$

The effect of varying $W_Z$ is seen in FIG. 4.3, where screenshot 3A (403a), screenshot 3B (403b), and screenshot 3C (403c) are based on Z weight (i.e., $W_Z$) of 0, 0.2, and 0.4, respectively. It is observed that the faults (seen as traces in upside down "V" shapes intersecting the stratigraphic layers) stand out more clearly when WZ approaches 0. For applications such as detecting salt, it has been observed that a WZ of approximately 0.2 gives improved imaging of the salt structures.

FIG. 4.4 shows the effect of the 3D operator with amplitude normalization. Normalization of the output has the property that edges in areas with high and low seismic amplitude areas become directly comparable, as both will be scaled to the interval [0, 1]. This will give better continuity for faults running through high and low amplitude layers, and will also highlight chaotic low amplitude areas, such as salt structures. Normalization is obtained by dividing the modified Sobel operator result with the sum of the weighted absolute values used in the computations of the partial derivatives, using the same weights as when weighting the partial derivatives, and where WZ is also applied as an extra weight for the values in the Z direction.

An example image of the effects of the normalization is shown as the screenshot 4A (404a). In comparison, the same image without the normalization is shown as the screenshot 4B (404b). For detection of faults, the results are sometimes better without normalization. The normalization step can be selectively turned on or off to achieve better visualization clarity dependent on the seismic data. For detection of salt structures, the normalization generally improves clarity as shown in the three screenshots of FIG. 4.5. The input amplitude range shown in FIG. 4.4 is fairly evenly distributed through out the input section. Thus the faults are clear even on the non-normalized image shown in screenshot 4B (404b).

Figure 5:
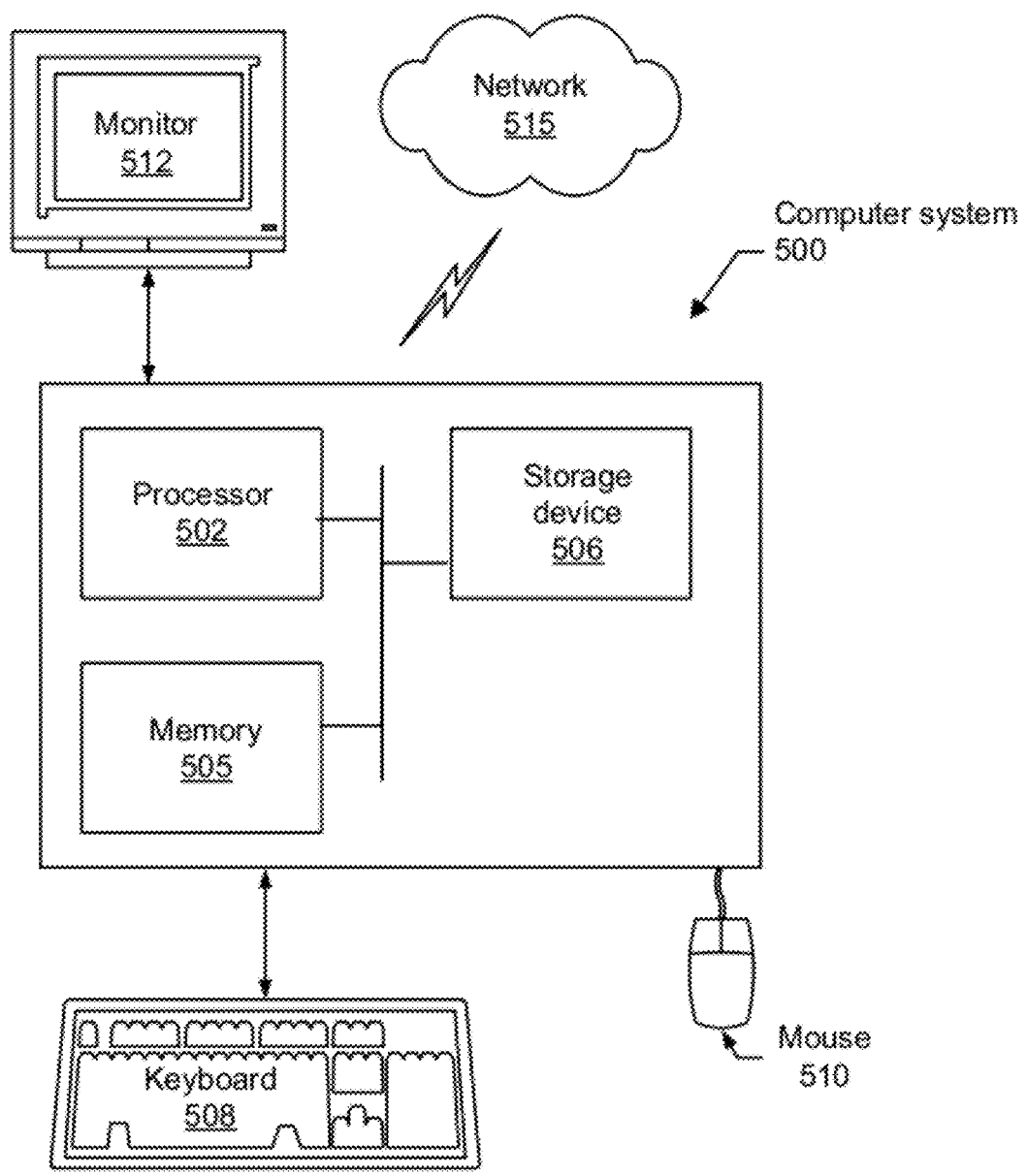
FIG. 5 depicts a computer system using which one or more embodiments of processing seismic data based on amplitude contrast seismic attribute may be implemented.

Embodiments of amplitude contrast seismic attribute may be implemented on virtually any type of computer regardless of the platform being used. For instance, as shown in FIG. 5, a computer system (500) includes one or more processor(s) (502) such as a central processing unit (CPU) or other hardware processor, associated memory (505) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display LCD, a plasma display, or cathode ray tube (CRT) monitor). The computer system (500) may be connected to a network (515) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (500) includes at least the minimal processing, input, and/or output means necessary to practice one or more embodiments.

Further, those skilled in the art will appreciate that one or more elements of the aforementioned computer system (500) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape, or any other computer readable storage device.

While amplitude contrast seismic attribute has been described with respect to a limited number of embodiments, those skilled in the art, having benefit of this disclosure, will appreciate that other embodiments may be devised which do not depart from the scope of amplitude contrast seismic attribute as disclosed herein. Accordingly, the scope of amplitude contrast seismic attribute should be limited only by the attached claims.

What is claimed is:

1. A method for visualizing of a subterranean formation, comprising:
    obtaining an estimated dip field of the subterranean formation, wherein the estimated dip field represents a measure of deviation of a stratigraphic layer from flat;
    selecting a voxel from a seismic volume;
    extracting, by a computer processor and from the seismic volume, a matrix data item, wherein the matrix data item comprises seismic data surrounding the voxel in the seismic volume, wherein the matrix data item is extracted from the seismic volume based on a value of the estimated dip field surrounding the voxel;
    generating, by the computer processor and using a matrix operator, a plurality of amplitude gradients from the seismic data in the matrix data item;
    normalizing, using the plurality of amplitude gradients, an amplitude value for the voxel to produce a normalized amplitude value for the voxel; and
    generating, using the normalized amplitude value, an image representing a portion of the subterranean formation.

2. The method of claim 1,
    wherein the matrix operator comprises a three dimensional (3D) operator,
    wherein the matrix data item comprises a 3 by 3 by 3 matrix represented by Data(x, y, z) for x, y, z in {−1, 0, 1},
    wherein the voxel comprises the seismic data, represented by Input(i, j, k), at position (i, j, k) of a voxel space,
    wherein the matrix data item is extracted based on Data(x, y, z)=Input(i+x, j+y, k+z+x*$dip_{IL}$ (i, j, k)+y*$dip_{XL}$ (i, j, k)),
    wherein $dip_{IL}$ (i, j, k) represents an inline dip of the estimated dip field at the position (i, j, k) of the voxel space, and
    wherein $dip_{XL}$, (i, j, k) represents a crossline dip of the estimated dip field at the position (i, j, k) of the voxel space.

3. The method of claim 1, wherein the matrix operator comprises a Sobel operator.

4. The method of claim 1, wherein normalizing the amplitude value further comprises:
    adjusting, based on pre-determined weighting factors, contributions of first, second, and third partial derivatives to the normalized amplitude value along a perpendicular direction of the stratigraphic layer.

5. The method of claim 1,
    wherein normalized amplitude value is represented by $$S=\sqrt{G_X^2+G_Y^2+W_Z^2 G_Z^2},$$

wherein $G_x$, $G_y$, and $G_z$ are proportional to a first, second, and third partial derivatives, respectively, and
    wherein $W_z$ is a pre-determined fraction.

6. The method of claim 5,
    wherein $W_z$ is in the range of approximately [0, 0.4].

7. A system for visualizing of a subterranean formation, comprising:
a seismic data processing module executing on a computer processor and configured to:
obtain an estimated dip field of the subterranean formation, wherein the estimated dip field represents a measure of deviation of a stratigraphic layer from flat;
select a voxel from a seismic volume;
extract, from the seismic volume, a matrix data item, wherein the matrix data item comprises seismic data surrounding the voxel in the seismic volume, wherein the matrix data item is extracted from the seismic volume based on a value of the estimated dip field surrounding the voxel; and
generate, using a matrix operator, a plurality of amplitude gradients from the seismic data in the matrix data item;
normalize, using the plurality of amplitude gradients, an amplitude value for the voxel to produce a normalized amplitude value for the voxel; and
generate, using the normalized amplitude value, an image representing a portion of the subterranean formation.

8. The system of claim 7,
wherein the matrix operator comprises a three dimensional (3D) operator,
wherein the matrix data item comprises a 3 by 3 by 3 matrix represented by Data(x, y, z) for x, y, z in {−1, 0, 1},
wherein the voxel comprises the seismic data, represented by Input(i, j, k), at position (i, j, k) of a voxel space,
wherein the matrix data item is extracted based on Data(x, y, z)=Input(i+x, j+y, k+z+x*$\text{dip}_{IL}$ (i, j, k)+y*$\text{dip}_{XL}$ (i, j, k)),
wherein $\text{dip}_{IL}$ (i, j, k) represents an inline dip of the estimated dip field at the position (i, j, k) of the voxel space, and
wherein $\text{dip}_{XL}$ (i, j, k) represents a crossline dip of the estimated dip field at the position (i, j, k) of the voxel space.

9. The system of claim 7, wherein the matrix operator comprises a Sobel operator.

10. The system of claim 7, wherein normalizing the amplitude value further comprises:
adjusting, based on pre-determined weighting factors, contributions of first, second, and third partial derivatives to the normalized amplitude value along a perpendicular direction of the stratigraphic layer,
wherein the matrix operator comprises first, second, and third matrix operators calculate the first, second, and third partial derivatives, respectively, along three orthogonal directions.

11. The system of claim 7,
wherein the normalized amplitude value is represented by $$S=\sqrt{G_X^2+G_Y^2+W_Z^2 G_Z^2},$$

wherein $G_x$, $G_y$, and $G_z$ are proportional to the first, second, and third partial derivatives, respectively, and
wherein $W_z$ is a pre-determined fraction.

12. The system of claim 11,
wherein $W_z$ is in the range of approximately [0, 0.4].

13. A non-transitory computer readable medium storing instructions for visualizing a subterranean formation, the instructions when executed causing a processor to:
obtain an estimated dip field of the subterranean formation, wherein the estimated dip field represents a measure of deviation of a stratigraphic layer from flat;
select a voxel from a seismic volume;
extract, from the seismic volume, a matrix data item, wherein the matrix data item comprises seismic data surrounding the voxel in the seismic volume, wherein the matrix data item is extracted from the seismic volume based on a value of the estimated dip field surrounding the voxel;
generate, using a matrix operator, a plurality of amplitude gradients from the seismic data in the matrix data item;
normalize, using the plurality of amplitude gradients, an amplitude value for the voxel to produce a normalized amplitude value for the voxel; and
generate, using the normalized amplitude value, an image representing a portion of the subterranean formation.

14. The non-transitory computer readable medium of claim 13,
wherein the matrix operator comprises a three dimensional (3D) operator,
wherein the matrix data item comprises a 3 by 3 by 3 matrix represented by Data(x, y, z) for x, y, z in {−1, 0, 1},
wherein the voxel comprises the seismic data, represented by Input(i, j, k), at position (i, j, k) of a voxel space,
wherein the matrix data item is extracted based on Data(x, y, z)=Input(i+x, j+y, k+z+x*$\text{dip}_{IL}$ (i, j, k)+y*$\text{dip}_{XL}$ (i, j, k)),
wherein $\text{dip}_{IL}$ (i, j, k) represents an inline dip of the estimated dip field at the position (i, j, k) of the voxel space, and
wherein $\text{dip}_{XL}$ (i, j, k) represents a crossline dip of the estimated dip field at the position (i, j, k) of the voxel space.

15. The non-transitory computer readable medium of claim 13, wherein the matrix operator comprises a Sobel operator.

16. The non-transitory computer readable medium of claim 13, wherein normalizing the amplitude value further comprises:
adjusting, based on pre-determined weighting factors, contributions of first, second, and third partial derivatives to the normalized amplitude value along a perpendicular direction of the stratigraphic layer,
wherein the matrix operator comprises first, second, and third matrix operators calculate the first, second, and third partial derivatives, respectively, along three orthogonal directions.

17. The non-transitory computer readable medium of claim 13,
wherein the normalized amplitude value is represented by $$S=\sqrt{G_X^2+G_Y^2+W_Z^2 G_Z^2},$$

wherein $G_x$, $G_y$, and $G_z$ are proportional to the first, second, and third partial derivatives, respectively, and
wherein $W_z$ is a pre-determined fraction.

18. The non-transitory computer readable medium of claim 17,
wherein $W_z$ is in the range of approximately [0, 0.4].

* * * * *